US012605720B2

(12) United States Patent
Hölscher et al.

(10) Patent No.: US 12,605,720 B2
(45) Date of Patent: Apr. 21, 2026

(54) SELF-EMPTYING SEPARATOR

(71) Applicant: GEA MECHANICAL EQUIPMENT GMBH, Oelde (DE)

(72) Inventors: Andreas Hölscher, Ennigerloh (DE); Thomas Bathelt, Oelde (DE)

(73) Assignee: GEA Mechanical Equipment GmbH, Oelde (DE)

(*) Notice: Subject to any disclaimer, the term of this patent is extended or adjusted under 35 U.S.C. 154(b) by 561 days.

(21) Appl. No.: 18/011,892

(22) PCT Filed: Jun. 10, 2021

(86) PCT No.: PCT/EP2021/065652
§ 371 (c)(1),
(2) Date: Dec. 21, 2022

(87) PCT Pub. No.: WO2021/259659
PCT Pub. Date: Dec. 30, 2021

(65) Prior Publication Data
US 2023/0241628 A1 Aug. 3, 2023

(30) Foreign Application Priority Data
Jun. 24, 2020 (DE) ..................... 10 2020 116 658.3

(51) Int. Cl.
*B04B 1/14* (2006.01)

(52) U.S. Cl.
CPC ...................................... *B04B 1/14* (2013.01)

(58) Field of Classification Search
CPC ......... B04B 1/14; B04B 11/04; G01F 11/021; G01F 15/02; G01F 11/02; G01F 22/02;
(Continued)

(56) References Cited

U.S. PATENT DOCUMENTS 4,401,429 A 8/1983 Koslowski
4,490,133 A 12/1984 Zettier
4,510,052 A 4/1985 Eklof

FOREIGN PATENT DOCUMENTS

DE 3009669 A1 9/1981
DE 3115875 C1 10/1982
(Continued)

OTHER PUBLICATIONS

International Search Report and Written Opinion mailed Oct. 8, 2021 in related/corresponding International Application No. PCT/EP2021/065652.
(Continued)

*Primary Examiner* — Claire X Wang
*Assistant Examiner* — Shuyi S. Liu
(74) *Attorney, Agent, or Firm* — PATENT PORTFOLIO BUILDERS PLLC

(57) ABSTRACT

A self-emptying separator includes solids discharge openings each having a piston valve that is moveable moved into an opening position and into a closing position in a fluid-actuated manner. The emptying mechanism also has a control assembly assigned to the piston valve and controls the opening and closing movements of the latter. The control assembly also includes a control device and a metering device for metering and dispensing the amount of liquid required for the opening process. The metering device has a metering element that is movable in a metering chamber and which subdivides the metering chamber into a fluid chamber and a pressure chamber intended to be supplied with compressed air. The metering device has an adjusting system for metering the amount of liquid required for the opening process in the fluid chamber. The adjusting system has a measuring device that operates based on a fluidic measurement principle.

9 Claims, 3 Drawing Sheets

Figure 1:
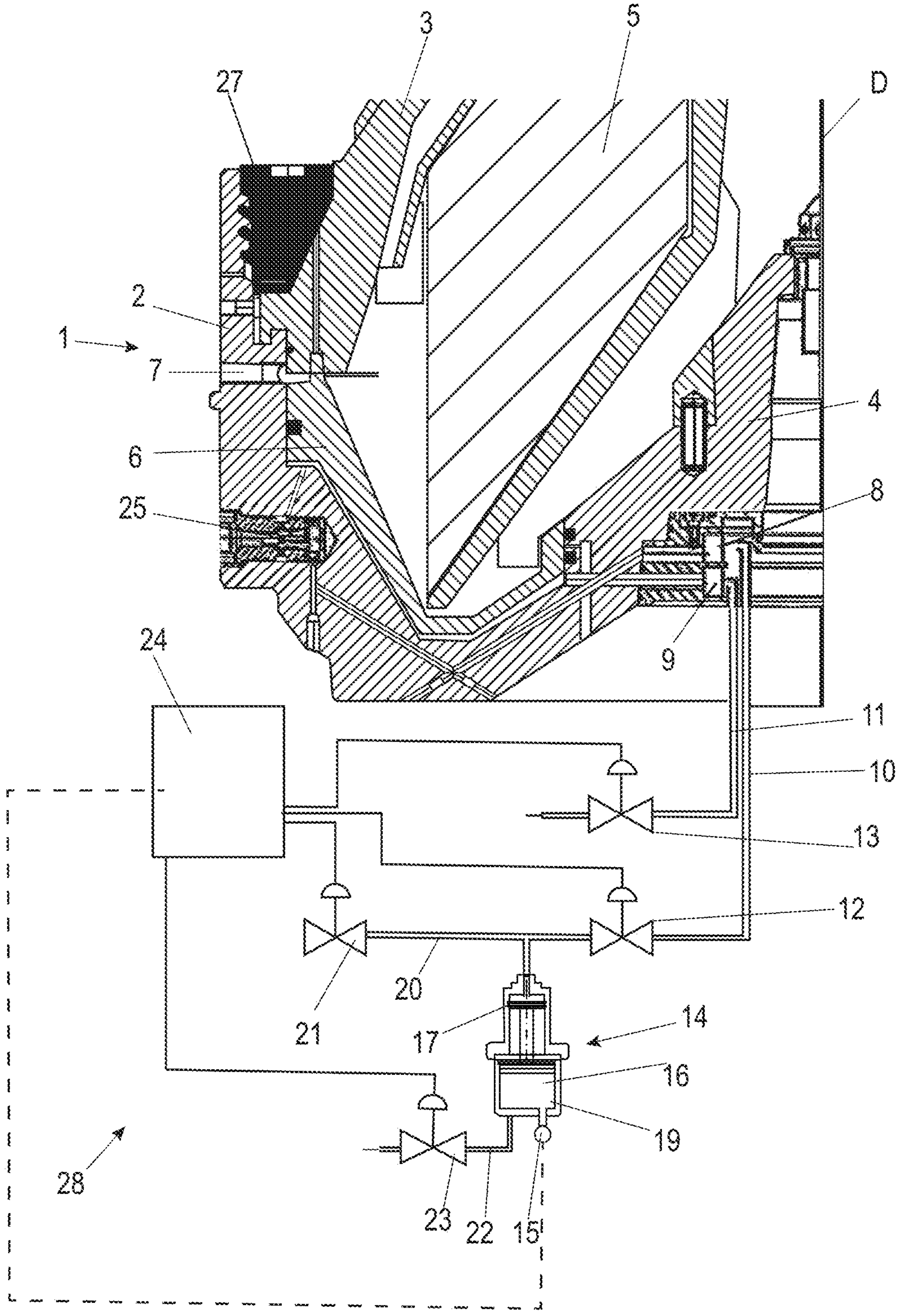

(58) Field of Classification Search
CPC .... G01F 25/0092; F16K 31/122; F16K 31/12; B01D 29/606; B01D 29/665
USPC .................................................. 494/1, 2, 10
See application file for complete search history.

(56) References Cited

FOREIGN PATENT DOCUMENTS

| | | | |
|---|---|---|---|
| DE | 3503696 | A1 | 8/1985 |
| DE | 102005049941 | A1 | 4/2007 |
| KR | 1020130105455 | A | 9/2013 |
| WO | 9916550 | A1 | 4/1999 |
| WO | 2007045595 | A1 | 4/2007 |

OTHER PUBLICATIONS

Search Report created Mar. 10, 2021 in related/corresponding DE Application No. 10 2020 116 658.3.
Office Action dated Jul. 30, 2025 in related/corresponding KR Application No. 10-2022-7043413.

SELF-EMPTYING SEPARATOR

BACKGROUND AND SUMMARY OF THE INVENTION

Exemplary embodiments of the invention relate to a self-emptying separator a method for processing a centrifugal material.

Discontinuously emptying separators as defined in this specification have, in addition to one or more outlets for one or more liquid phases, an emptying mechanism with a piston valve that is fluid-actuated, in particular with liquid as fluid, and can be moved alternately into an open position and into a closed position, as a result of which the piston valve opens (open position) and closes (closed position) solids discharge openings in the drum wall. In the open position, a solids phase is discharged from the centrifugal drum. This is not the case in the closed position.

To ensure precise operation of such a drum emptying system of a self-emptying separator, it may have a fluid supply and discharge system with a piston valve. This serves to fill a chamber on the piston valve with fluid—a liquid—and it serves to allow fluid to escape from a chamber on the piston valve for emptying solids, so that the piston valve can move. For example, in a separator with a vertical axis of rotation, fluid can escape below a piston valve so that the product in the drum pushes it down vertically. The aim here is to supply a volume of liquid as precisely measured as possible to the hydraulic system of the centrifugal drum in a short time during discharge (“opening fluid”). The volume of the opening fluid thus determines the discharge quantity.

In many separation processes, it is advantageous to be able to flexibly set or regulate or more generally change the emptying volume via an electronic control device. The challenge here is to reliably meter a fluid volume that varies as needed and is as accurate as possible for the specific requirement, even if the upstream pressure in the fluid supply is subject to considerable fluctuations.

DE 31 15 875 C1 discloses a metering device with a housing and a metering element movably guided therein, which can be a metering piston or a metering diaphragm for example, is used to meter the volume of the opening fluid. When the housing is filled with fluid, the metering element is moved and pressed against a stop of an adjusting screw. The quantity of liquid measured in this way is then used as the opening fluid, e.g., to open a piston valve in the centrifugal drum. For this purpose, the metering element is pressed back into an end position, e.g., pneumatically, whereby the fluid can be or is conveyed into the centrifugal drum and thus to the piston valve in the corresponding valve position.

By adjusting a set screw, a stop position for the metering element is changed as required, which in turn changes the amount of liquid metered by the metering device. However, this means that the operator must manually set the required emptying volume directly on the machine. In DE 31 15 875 C1, a deformable diaphragm is used as the metering element.

A variant of this metering device is described in DE 10 2005 049 941 A1. Here, a metering piston guided in a cylinder as a housing is used as the metering element. The stroke of the metering piston is limited by a threaded rod, which forms the stop for the metering piston. The position of the stop can be adjusted by an electric motor so that the volume of the opening fluid can be set via an electronic control system or, optionally, adjusted automatically.

Metering devices according to the prior art have proven themselves well in practice, but these solutions require mechanical actuators for metering to move to the desired position of the piston with the threaded spindle. This can be a hindrance in the case of high dynamic requirements for the regulating processes for solids discharge.

Exemplary embodiments of the invention solve this problem.

According to embodiments, a self-emptying separator comprises a rotatable centrifugal drum having a vertical axis of rotation and provided with solids discharge openings, to which an emptying mechanism having a piston valve is assigned, which piston valve can be moved into an opening position and into a closing position in a fluid-actuated manner, in particular by means of a liquid. The emptying mechanism further comprises a control assembly assigned to the piston valve for controlling its opening and closing movements, which is provided with a control device and with a metering device for metering and dispensing the amount of fluid, in particular the amount of liquid, required for the opening process. The metering device has a metering element that is displaceable in a metering chamber and which subdivides the metering chamber into a fluid chamber and into a pressure chamber for the application of compressed air, and wherein the metering device has an adjusting system for metering the amount of fluid, in particular the amount of liquid, required for the opening process in the fluid chamber, which adjusting system has a measuring device.

According to the invention, which is particularly easy to implement and yet works precisely, it is further provided that the measuring device is based on a fluidic measuring principle. Preferably, no mechanical actuators, such as a threaded spindle, are required to adjust the opening fluid volume. Thus, the metering device can advantageously meet even very high dynamic requirements of the regulating processes for solids discharge.

According to the invention, it is further provided that the adjusting system with the measuring device, which is based on a fluidic measuring principle, has a pressure measuring device arranged in the pressure chamber, with which the pressure in the pressure chamber can be determined, wherein the pressure in the pressure chamber is or forms a basis of or for metering the amount of fluid required for the opening process. In this way, the feature of the contactless measuring principle is implemented in a particularly advantageous and constructively simple manner.

The fluid used for the opening process is a liquid, preferably it is water or another liquid can be used, such a flowable product to be processed in the separator or a phase of this product.

In a preferred embodiment variant of the invention, the control assembly has an injection chamber for opening fluid and an injection chamber for closing fluid, to which the fluid, in particular water, can be supplied for activating the opening and closing movements via an opening fluid supply and a closing fluid supply, respectively, in which an opening fluid valve and a closing fluid valve are arranged, wherein preferably the metering device is assigned to the opening fluid supply. This creates a device with which a defined quantity of solids (phase) can be emptied from a separator quickly and safely as well as precisely.

It is preferably provided in this context that the metering device has a metering element that is movable in a metering chamber and subdivides the metering chamber into a fluid chamber and a pressure chamber to which compressed air is applied. This advantageously creates a structurally simple metering device.

In particular, it can be advantageously provided that the metering element is a piston. This creates a robust and precisely usable metering element. However, the metering element can also have an inherently deformable diaphragm.

It can be optionally provided that the pressure chamber has a temperature sensor. In this way, temperature fluctuations in the pressure chamber of the metering device can be compensated simply by design, in that the control system varies or adjusts the pressure setpoint accordingly when filling the fluid chamber.

According to a further variant of the invention, it can be provided that the pressure chamber under the metering element is designed to be gas-tight. This advantageously minimizes adverse influences such as pressure fluctuations or inaccurate measurements of the pressure measuring device and thus inaccurate metering of the opening fluid.

It is also advantageous if, according to a further option, the volume of the pressure chamber is dimensioned so that even when the fluid chamber is filled to the maximum, the pressure in the opening fluid supply is still higher than a counterpressure in the pressure chamber. This results in safe operation of the metering device as a result of a simple design measure.

Furthermore, it is advantageous if, according to one option, an orifice plate is installed in the opening fluid supply. This limits the inflow quantity of the opening fluid so that the filling process can be slowed down even at high fluid pressures so that the target position of the metering element can be approached safely.

In a further advantageous embodiment variant of the invention, the orifice plate is arranged directly upstream of the filling valve. This makes it easy to integrate the orifice plate into the opening fluid supply. For example, it can be integrated in a screw connection between the pipeline and the valve.

The invention also provides the method that is an advantageous and simple method for performing a solids discharge in a processing of a flowable product with a separator and is characterized by the method steps of:

a) providing a self-emptying separator according to one or more of the claims related thereto and processing a flowable product to be processed, separating it into at least a liquid phase and a solid phase;
b) opening of a filling valve, causing the metering element to move towards the pressure chamber due to the incoming fluid, wherein the pressure in the pressure chamber increases;
c) carrying out a measurement or repeated measurements in or on the pressure chamber with a measuring device and comparing the measurement result with a preset value manually or with a control unit; wherein in step c) the pressure in the pressure chamber is measured with a pressure measuring device and the measured pressure is compared with a predetermined pressure as default value manually or with a control device;
d) closing the filling valve when the measured value corresponds to the default value; so that a metered opening fluid volume is present in the fluid chamber, wherein in step d) a closing of the filling valve takes place when the measured pressure corresponds to the predetermined pressure, so that a metered opening fluid volume is present in the fluid chamber, and
e) opening the opening fluid valve and the valve of a compressed air line to inject the metered opening fluid volume in the fluid chamber into the separator via an opening fluid supply and an injection chamber for opening fluid and thereby moving a piston valve from a closed position to an open position so that the solids discharge openings are released and the solids phase is discharged from the centrifugal drum.

This simple and precise method offers at least the advantages which are also given with regard to the device and also leads to a precise adjustability of the metering volume.

BRIEF DESCRIPTION OF THE DRAWING FIGURES

Figure 2:
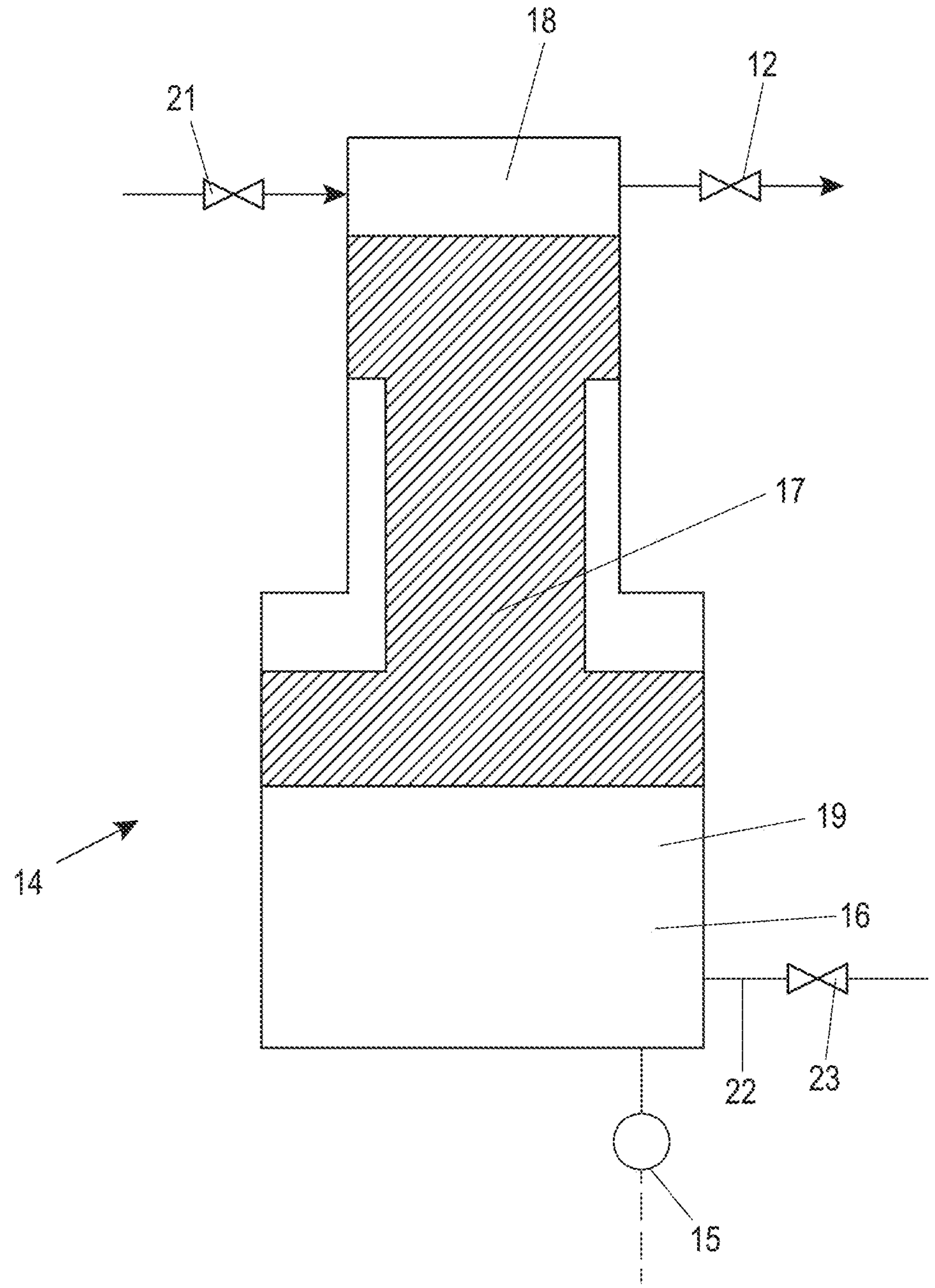
Figure 3:
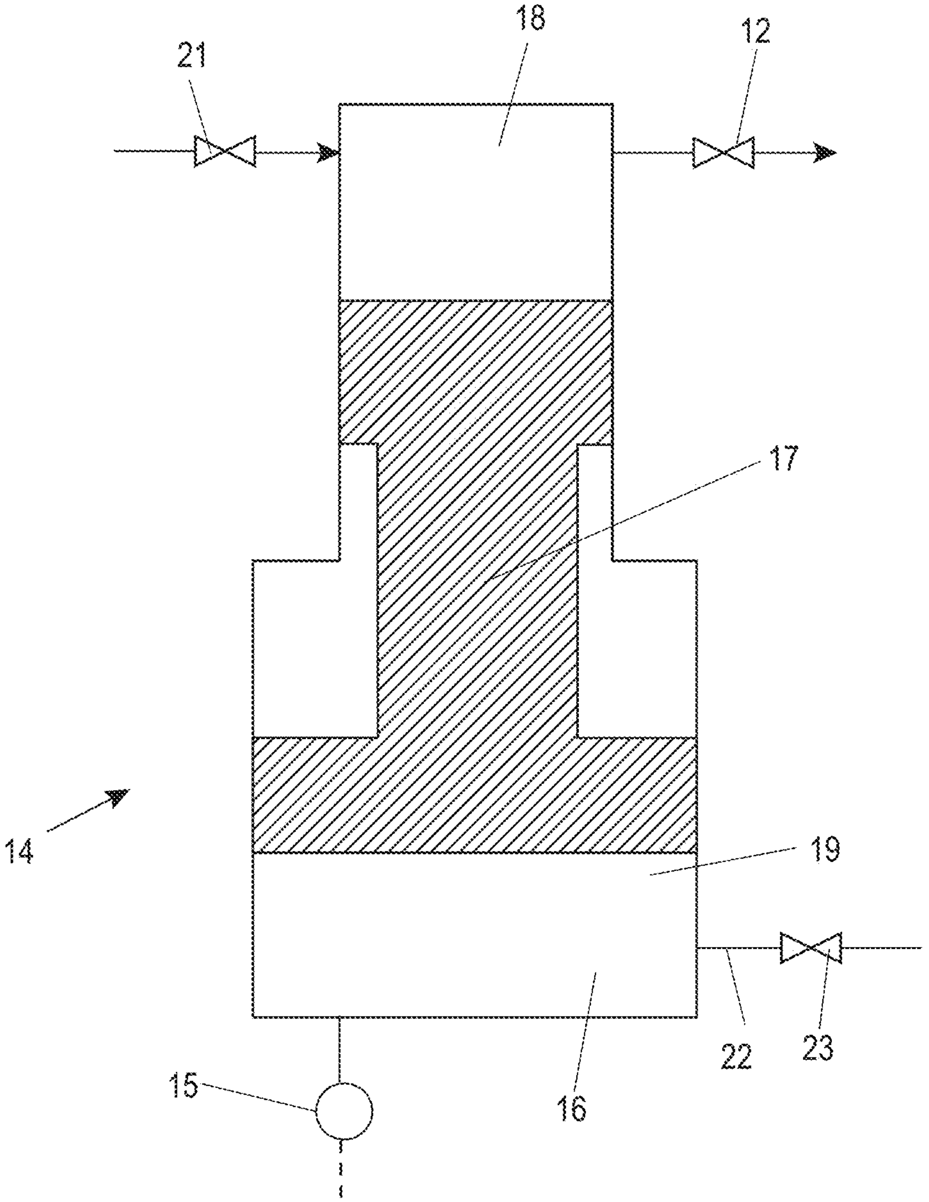

The invention is described in more detail below by means of exemplary embodiments with reference to the drawing. The invention is not limited to these exemplary embodiments, but can also be realized in other ways according to the wording or in other equivalent ways, wherein:

FIG. 1: shows a partial section of a centrifugal drum in cross-section and a block diagram of an emptying mechanism of the centrifugal drum for a solid phase;

FIG. 2: shows a sectional view of a metering device according to the invention and a block diagram of the metering device, wherein the metering device is shown in a first position;

FIG. 3: shows a sectional view of the metering device and a block diagram of the metering device, with the metering device shown in a second position.

DETAILED DESCRIPTION

In the following description of figures, an exemplary embodiment is described. The individual features of this exemplary embodiment can also be combined with exemplary embodiments not shown, and are also each suitable as advantageous designs of the subject matters described in one or more of the main claims and subclaims.

FIG. 1 shows a lower lateral section of a rotatable centrifugal drum 1 of a centrifuge designed as a separator. The centrifugal drum 1 can have a vertical axis of rotation D.

The centrifugal drum can be single and/or, as in this case, double conical (at the bottom and/or top and, in particular, on the inside). The centrifugal drum 1 is preferably designed for continuous operation.

The centrifugal drum 1 may have a lower drum part 2 and an upper drum part 3. These drum parts 2, 3 can be connected to each other in various ways, such as with a locking ring 27.

A distributor 4 for product feed and a disc stack 5 of separator discs are arranged in the centrifugal drum 1.

A feed pipe and liquid outlets are not shown. They can be realized in any way.

An emptying mechanism is used for discharging a solids phase, which comprises a piston valve 6 for opening and closing solids discharge openings 7, which may be formed in a circumferentially distributed manner in the region of the largest diameter of the centrifugal drum 1. The emptying mechanism further comprises a control assembly 28 associated with the piston valve 6 for controlling its opening and closing movements.

The control assembly 28 comprises a control unit 24. The control assembly 28 further comprises an injection chamber 8 for opening fluid and an injection chamber 9 for closing fluid, to which a fluid, in particular water, can be supplied via an opening fluid supply 10 and a closing fluid supply 11, in which an opening fluid valve 12 and a closing fluid valve 13 can be arranged, for activating the opening and closing movements.

Associated with the opening fluid supply 10 is a metering device 14, which is connected upstream of the opening fluid valve 12.

The metering device 14—see also FIG. 2—has a movable, in particular displaceable, metering element 17 in a metering chamber 16, which subdivides the metering chamber 16 into a fluid chamber 18 and a pressure chamber 19 for admission of fluid, in particular a gas such as compressed air. The metering element 17 is designed here as a displaceable piston. As an alternative to the piston, a movable, in particular inherently deformable, diaphragm can also be used as metering element 17.

The fluid chamber 18 is formed between a filling valve 21 and the opening fluid valve 12 and the adjusting element 17.

A compressed air line 22, into which a valve 23 is connected, also opens into the pressure chamber 19. The control input of all controllable valves can be connected to the control unit 24.

A piston valve 25, which is inserted into a wall of the centrifugal drum 1, is used for the controlled discharge of the fluid used to perform the opening and closing movements of the piston valve 6 (see FIG. 1).

Furthermore, an orifice plate can be additionally installed in the fluid supply line 20 in order to limit the inflow quantity of the opening fluid and thus to slow down the filling process even at high fluid pressures so that the target position of the metering element 17, at which the preselected pressure is reached, can be approached safely. An advantageous position of the orifice plate—viewed in the direction of flow—is directly upstream of the filling valve 21.

The pressure chamber 19 can be filled with fluid, in particular air, through the compressed air line 22 on a first side—in this case “below” the metering element 17—so that a pressure can be built up in it. However, it can also be “vented” via this valve 23. The pressure chamber 19 is designed to be correspondingly gas-tight for this purpose.

When filling the fluid chamber 18 on the other side—here purely pictorially “above” the metering element 17—with fluid, in particular opening fluid, through the fluid supply line 20—the fluid, in particular the air, is compressed in the pressure chamber 19 and a pressure increase occurs in the pressure chamber 19 on the first side “below” the metering element 17, wherein this pressure increase in the pressure chamber 19 is essentially proportional to the change in position of the metering element 17 in the metering chamber 16, starting here by way of example from the position of FIG. 2.

A measuring device 15 is arranged in the pressure chamber 19 or such a measuring device is connected to the pressure chamber 19 so that the pressure in the pressure chamber 19 can be determined with it.

With the pressure measuring device 15, the pressure in the pressure chamber 19 can be measured once or repeatedly in such a way that the position of the metering element 17 can be determined via the pressure measurement by comparison with a pre-stored table or a stored functional relationship or the like. This position in turn makes it possible to determine the current fluid volume in the fluid chamber 18.

For this purpose, it can be provided that the measured pressure value is passed on to the control unit 24 in order to be able to repeatedly determine the volume of the supplied fluid by measurements on the basis of this measured value with the control unit 24 or via the control unit 24 and thus also to be able to set it precisely. The filling of the fluid chamber 18 can be stopped when a desired filling or a desired preset metering volume has been reached or set.

Alternatively, the pressure value at the pressure measuring device 15 could also be read manually and used for adjustment in this way.

In this way, the metering device 14 here has an adjusting system for measuring the amount of fluid—in this case the opening fluid volume—for actuating the emptying mechanism, which is based on a fluidic measuring principle. Variants of the illustrated system can be realized within the scope of professional skill.

The volume of the pressure chamber 19 on the first side of the metering element 17 and that of the fluid chamber 18 on the other side of the metering element 17 are preferably each dimensioned so that even when the fluid chamber 18 is filled to the maximum, the pressure in the fluid supply line 20 is still higher than the back pressure in the pressure chamber 19.

An additional temperature sensor (not shown) in the pressure chamber 19 can be used to compensate for temperature variations by allowing the control unit 24 to vary a pressure setpoint accordingly when filling the fluid chamber 18.

The function of this arrangement in the processing of a centrifugal material may be briefly summarized again:

In a first position of the metering device 14, which is shown in FIG. 2, the position of the metering element 17 is “up” or towards the fluid chamber 18, so that the volume of the fluid chamber 18 is small. The pressure chamber 19 is at ambient pressure. Alternatively, the pressure chamber 19 can also have a defined upstream pressure. The filling valve 21 towards the fluid chamber 18 is closed. The opening fluid valve 12 is closed. The valve 23 of the compressed air line 22 is also closed.

Now the filling valve 21 is opened. The incoming fluid causes the metering element 17 to move downward to a second position, as shown in FIG. 3, and the measured value of the pressure in the pressure chamber 19 increases. When the measured value reaches a preselected set value, which corresponds to a defined fluid volume in the fluid chamber 18, the filling valve 21—controlled manually or automatically with the control device 24—is closed. For example, in such a way, the pressure in the pressure chamber can advantageously form a basis of the metering of the fluid volume required for opening.

Now the opening fluid valve 12 and the valve 23 in the compressed air line 22 are opened to inject the metered opening fluid volume in the fluid chamber 18 into the drum via the opening fluid supply 10 and the injection chamber 8 for opening fluid, open the piston valve 25 and thereby move the piston valve 6—here vertically downwards—into the open position, so that the solids discharge openings 7 are released and the solids phase is discharged from the centrifugal drum 1.

The measuring principle can thus be a type of non-contact measuring principle. Preferably, no mechanical actuators, such as a threaded spindle, are required to adjust the opening fluid volume. Thus, the metering device 14 can advantageously meet even very high dynamic requirements of the regulation processes for solids discharge.

The control unit 24 can be controlled with a computer program product that takes over the separator control and regulation and, if necessary, also controls the actuation of the piston valve, in particular also the metering, in particular also the performance and execution of the measurements.

Existing centrifuges with a metering device with mechanical actuators for measuring the opening fluid volume can advantageously be easily retrofitted or converted with the metering device 14 according to the invention, since often only the mechanical actuators, such as a threaded rod, have to be exchanged for a measuring device 15, and the software of the control system has to be adapted.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Centrifugal drum
2 Lower drum part
3 Upper drum part
4 Distributor
5 Disc stack
6 Piston valve
7 Solids discharge opening
8 Injection chamber for opening fluid
9 Injection chamber for closing chamber
10 Opening fluid supply
11 Closing fluid supply
12 Opening fluid valve
13 Closing fluid valve
14 Metering device
15 Measuring device
16 Metering chamber
17 Metering element
18 Fluid chamber
19 Pressure chamber
20 Fluid supply line
21 Filling valve
22 Compressed air line
23 Valve
24 Control unit
25 Piston valve
27 Locking ring
28 Control assembly
D Axis of rotation

The invention claimed is:

1. A self-emptying separator, comprising:

a rotatable centrifugal drum having a vertical axis of rotation, solids discharge openings, and an emptying mechanism having a piston valve assigned to each of the solids discharge openings, wherein the piston valve is moveable between an opening position and a closing position in a fluid-actuated manner using fluid, wherein the emptying mechanism further comprises a control assembly coupled to the piston valve and configured to control opening and closing movements of the piston valve, wherein the control assembly includes a control unit and a metering device configured to meter and dispense an amount of liquid required for moving the piston valve to the open position, wherein the metering device has a metering element that is displaceable in a metering chamber and which subdivides the metering chamber into a fluid chamber and a pressure chamber for application of compressed air, wherein the metering device has an adjusting system for metering the amount of liquid required for the opening process in the fluid chamber, wherein the adjusting system has a measuring device, wherein the measuring device is configured to measure based on a fluidic measuring principle, and wherein the measuring device is a pressure measuring device arranged in the pressure chamber, wherein the pressure measuring device is configured to measure pressure in the pressure chamber, wherein the pressure in the pressure chamber is used for the metering of the amount of liquid required to move the piston valve to the open position.

2. The self-emptying separator of claim 1, wherein the control assembly has an injection chamber for opening fluid, wherein the opening fluid is water, and wherein the injection chamber is configured to feed the water via an opening fluid supply, in which an opening fluid valve is arranged, to activate opening movements of the piston valve.

3. The self-emptying separator of claim 1, wherein the metering element is a piston or a diaphragm.

4. The self-emptying separator of claim 1, wherein the pressure chamber has a temperature sensor.

5. The self-emptying separator of claim 1, wherein a volume of the pressure chamber is dimensioned in such a way that, even when the fluid chamber is filled to a maximum, pressure in a fluid supply line is still higher than a counterpressure in the pressure chamber.

6. The self-emptying separator of claim 1, wherein the fluid chamber is connected between a filling valve and the opening fluid valve.

7. The self-emptying separator of claim 6, wherein an orifice plate is incorporated in a fluid supply line.

8. The self-emptying separator of claim 7, wherein the orifice plate is arranged immediately upstream of the filling valve.

9. A method for performing a solids discharge in a processing of a flowable product with a separator, the method comprising:

a. providing a self-emptying separator and processing a flowable product to be processed, separating it at least into a liquid phase and a solid phase, wherein the self-emptying separator includes a rotatable centrifugal drum having a vertical axis of rotation, solids discharge openings, and an emptying mechanism having a piston valve assigned to each of the solids discharge openings, wherein the piston valve is moveable between an opening position and a closing position in a fluid-actuated manner using fluid, wherein the emptying mechanism further comprises a control assembly coupled to the piston valve and configured to control opening and closing movements of the piston valve, wherein the control assembly includes a control unit and a metering device configured to meter and dispense an amount of liquid required for moving the piston valve to the open position, wherein the metering device has a metering element that is displaceable in a metering chamber and which subdivides the metering chamber into a fluid chamber and a pressure chamber for application of compressed air, wherein the metering device has an adjusting system for metering the amount of liquid required for the opening process in the fluid chamber, wherein the adjusting system has a measuring device, wherein the measuring device is configured to measure based on a fluidic measuring principle, and wherein the measuring device is a pressure measuring device arranged in the pressure chamber, wherein the pressure measuring device is configured to measure pressure in the pressure chamber, wherein the pressure in the pressure chamber forms a basis for the metering of the amount of liquid required to move the piston valve to the open position;

b. opening a filling valve, causing the metering element to move towards of the pressure chamber due to the incoming fluid, wherein the pressure in the pressure chamber increases;

c. performing a measurement or repeated measurements in or on the pressure chamber with the measuring device and comparing a measurement result with a preset value manually or with a control unit, wherein in step c) the pressure in the pressure chamber is measured with the pressure measuring device and the measured pressure is compared with a predetermined pressure as default value manually or with a control device;

d. closing the filling valve when the measured value corresponds to the default value so that a metered opening fluid volume is present in the fluid chamber, wherein in step d) a closing of the filling valve takes place when the measured pressure corresponds to the predetermined pressure so that the metered opening fluid volume is present in the fluid chamber; and e. opening the opening fluid valve and a venting valve of a compressed air line to inject the metered opening fluid volume in the fluid chamber into the separator via an opening fluid supply and an injection chamber for opening fluid, to open the piston valve and to thereby move the piston valve from a closed position to an open position so that the solids discharge openings are released and the solids phase is discharged from the centrifugal drum.

* * * * *